United States Patent [19]

Kinoshita

[11] Patent Number: 4,860,245
[45] Date of Patent: Aug. 22, 1989

[54] VECTOR DATA PROCESSING SYSTEM COMPRISING AN I/O CONTROL FOR EACH VECTOR DATA PROCESSOR AND ANOTHER I/O CONTROL FOR AT LEAST ONE OTHER VECTOR DATA PROCESSOR

[75] Inventor: Seiichiro Kinoshita, Tokyo, Japan
[73] Assignee: NEC Corporation, Tokyo, Japan
[21] Appl. No.: 105,028
[22] Filed: Oct. 6, 1987
[30] Foreign Application Priority Data
  Oct. 8, 1986 [JP] Japan .................. 61-237851
[51] Int. Cl.[4] .............................................. G06F 9/00
[52] U.S. Cl. ................................................ 364/900
[58] Field of Search ... 364/200 MS File, 900 MS File
[56] References Cited
  U.S. PATENT DOCUMENTS

| | | | |
  |---|---|---|---|
  | 3,560,934 | 2/1971 | Ernst et al. | 364/200 |
  | 4,128,880 | 12/1978 | Cray, Jr. | 364/200 |
  | 4,641,275 | 2/1987 | Hatakeyama et al. | 364/900 |
  | 4,665,479 | 5/1987 | Oinaga | 364/200 |

FOREIGN PATENT DOCUMENTS
  0184791A1 12/1985 European Pat. Off. .

Primary Examiner—Gareth D. Shaw
Assistant Examiner—John G. Mills
Attorney, Agent, or Firm—Foley & Lardner, Schwartz, Jeffery, Schwaab, Mack, Blumenthal & Evans

[57] ABSTRACT

In a processing system including a predetermined number m of vector data processors, a distributor (42) and a selector (47) are used together with a bus (51) in moving vector elements within each vector data processor (16). Connections between a common distributor (39), another distributor (41) and another selector (46) are used in moving vector elements from each vector data processor to at least one other vector data processor (17). Each set of vector registers (21-28), one in each vector data processor, is provided for holding those vector elements of a vector datum which are given element numbers. Preferably, vector elements are moved within each vector data processor when a vector move instruction indicates a start element number which is congruent with zero modulo m. Otherwise, vector elements are moved among the vector data processors with the common distributor controlled in response to the vector move instruction.

3 Claims, 4 Drawing Sheets

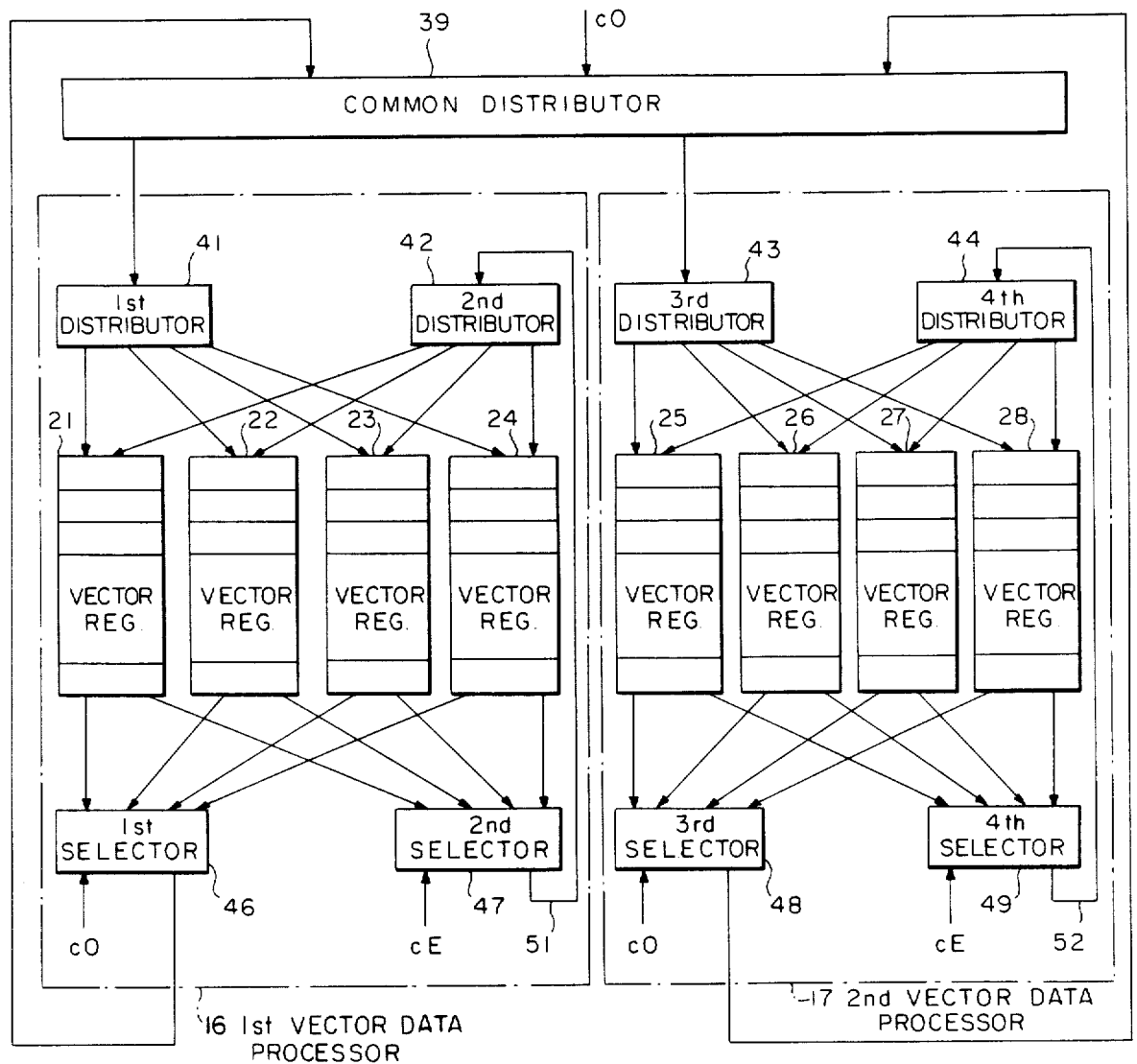
F I G . 5

VECTOR DATA PROCESSING SYSTEM COMPRISING AN I/O CONTROL FOR EACH VECTOR DATA PROCESSOR AND ANOTHER I/O CONTROL FOR AT LEAST ONE OTHER VECTOR DATA PROCESSOR

BACKGROUND OF THE INVENTION

This invention relates to a vector data processing system which comprises a plurality of vector registers and other circuit or system components related to the vector registers.

Such a vector data processing system is already known. For example, a vector processing system is disclosed in U.S. Pat. No. 4,128,880 issued to Seymour R. Cray, Jr., and assigned to Cray Research, Inc. An information processing device was invented by Hideo Hayashi for use as a vector data processing system. Among patent applications filed in several countries for the information processing device, one filed under the European Patent Convention by NEC Corporation, the assignee of the instant application, is published under Patent Publication No. 0 184 791 A1.

According to Cray, Jr., the vector processing system comprises a plurality of vector registers, a functional unit, such as an adder or a multiplier, a controller, such as an assembly of instruction buffers, an input fan-out for communicating with individual vector registers, and an output fan-out for communicating from any one of the vector registers to the functional unit. The input and the output fan-outs are collectively called a signal path select. According to Hayashi, the information processing device comprises a plurality of vector registers, a functional unit, a controller, a multiplexer connected to the vector registers, and a selector which is also connected to the vector registers. The selector has a function which is somewhat different from the output fan-out of Cray, Jr. At any rate, it is possible to refer to the input fun-out or the multiplexer as a distributor unit, to the output fan-out as a selector unit, and to either the signal path select or a combination of the distributor and the selector of Hayashi as an input/output (I/O) complex.

According to either of Cray, Jr., and Hayashi, the vector data processing system is used in an electronic digital computer comprising a main memory and is operable in compliance with program instructions. Each vector register is for holding a prescribed number of vector elements.

The program instructions may include vector move or transfer instructions. In the manner which will later be described more in detail, a vector move instruction specifies one and another of the vector registers as a source register and a destination register and transfers the vector elements from the source register to the destination register through the input/output complex.

It will later be described in detail that the vector registers are divisible into a predetermined number m of groups, each group comprising a plurality of vector registers. In this event, it is convenient to divide the input/output complex into a plurality of input/output units assigned to the respective groups. Each group may be named a vector data processor. Under the circumstances, each vector data processor comprises a plurality of vector registers, a distributor unit connected to the vector registers, and a selector unit which is also connected to the vector registers. In the manner which will later become clear, division into a predetermined number m of vector data processors is desirable in attaining a high speed for a vector processing operation which is executed in response to at least one of the program instructions.

It should be noted in connection with the foregoing that the vector move instruction should specify one of the vector data processors that includes the destination register and that may or may not be different from the vector data processor including the source register. For this purpose, the vector data processing system may comprise a common distributor between the distributor units of the respective vector data processors and the selector units thereof. Use of such a common distributor, however, adversely affects the high speed as will later become clear.

SUMMARY OF THE INVENTION

It is therefore a basic object of the present invention to provide a vector data processing system comprising a predetermined number of vector data processors wherein each vector data processor comprises a plurality of vector registers.

It is a principal object of this invention to provide a vector data processing system of the type described, which is operable at a high speed in response to a vector move or transfer instruction.

Other objects of this invention will become clear as the description proceeds.

It is possible in describing the gist of this invention to define that a vector data processing system to which this invention is applicable, comprises a predetermined number m of vector data processors wherein each vector data processor comprises a plurality of vector registers, a distributor unit, and a selector unit, each of the distributor and the selector units being connected to the vector registers.

According to this invention, the distributor unit comprises a first and a second distributor. The selector unit comprises a first and a second selector. Each of the first and the second distributors and the first and the second selectors is connected to the vector registers. The above-defined vector data processing system further comprises a common distributor connected to the first distributors of the respective vector data processors and to the first selectors of the respective vector data processors. Each of the vector data processors further comprises a bus between the second distributor and the second selector of the last-mentioned each vector data processor.

In the manner described heretobefore, it is possible to refer to a combination of the first distributor and the first selector as a first input/output control and to another combination of the second distributor and the second selector as a second input/output control. As will presently become clear, the second input/output control of one of the vector data processors is for that one of the vector data processors alone. The first input/output control is for at least one other vector data processor. More particularly, the second input/output control is for controlling input/output of the vector registers connected thereto. The first input/output control of one of the vector data processors is for controlling input/output between the vector registers connected thereto and the vector registers of at least a different one of the vector data processors.

BRIEF DESCRIPTION OF THE DRAWING

FIG. 5 is a block diagram of a vector data processing system according to an embodiment of this invention.

DESCRIPTION OF THE PREFERRED EMBODIMENTS

Figure 1:
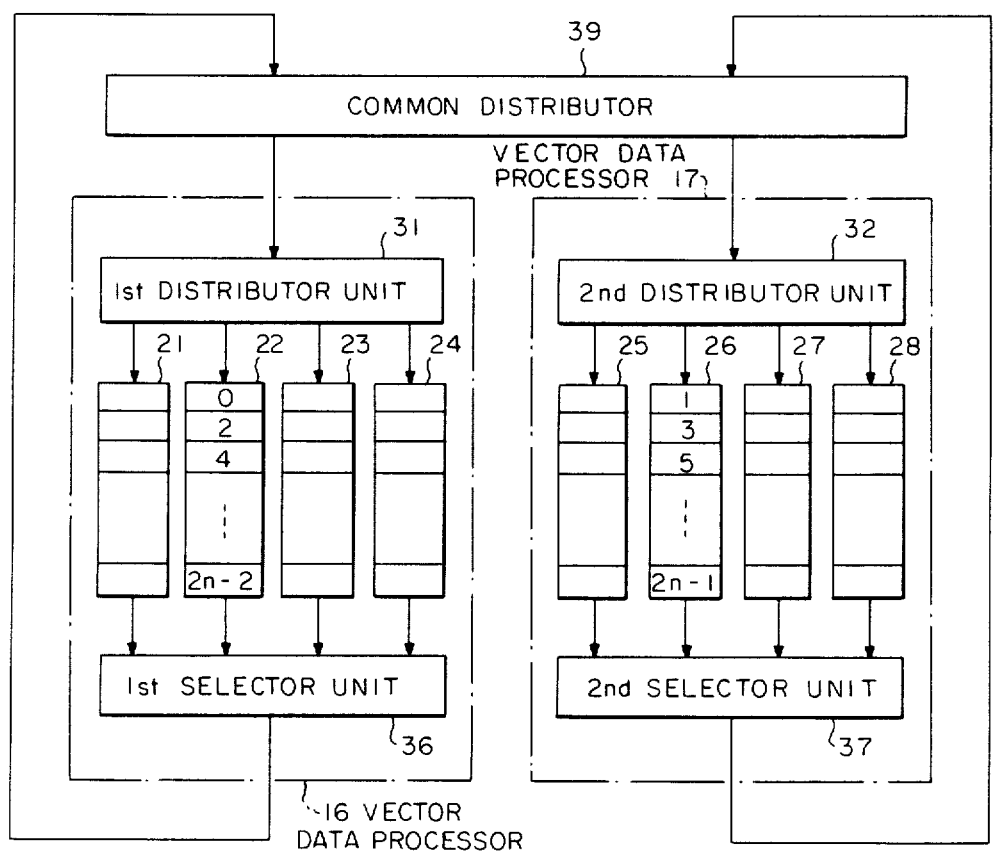
FIG. 1 shows a block diagram of a vector data processing system for use in facilitating an understanding of the present invention.

Referring to FIG. 1, a fundamental or basic vector data processing system will be described at first in order to facilitate an understanding of the present invention. The fundamental vector data processing system is designed merely for convenience of description of a vector data processing system according to this invention and comprises a predetermined number m of vector data processors which may be called first through m-th vector data processors.

In an example being illustrated, the fundamental vector data processing system comprises first and second vector data processors 16 and 17. In the manner known in the art and described heretobefore, the vector data processing system further comprises a functional unit and a controller which are not depicted because the functional unit and the controller are of no direct concern with this invention. The functional unit, as herein called, may comprise a vector adder, a vector multiplier, and a logical processor in the manner described in the Cray, Jr., patent referred to hereinabove.

Each of the first and the second vector data processors 16 and 17 comprises a plurality of vector registers. The vector registers of the vector data processors, such as 16 and 17, are given vector register numbers which are common throughout the vector data processors. It will be presumed merely for simplicity of the description that the predetermined number m is equal to two in the following.

By way of example, the first vector data processor 16 comprises first through fourth vector registers 21, 22, 23, and 24, four in number. The second vector data processor 17 comprises fifth through eighth vector registers 25, 26, 27, and 28. In general, the second vector data processor 17 comprises four vector registers 25 through 28 in this manner, that is, a plurality of vector registers which are equal in number to the vector registers 21 through 24 of the first vector data processor 16.

It will be assumed that the first and the fifth vector registers 21 and 25 are given a first register number in common and are No. 1 vector registers. Similarly, the second and the sixth vector registers 22 and 26 have a second register number in common and are No. 2 vector registers. The third and the seventh vector registers 23 and 27 have a third register number in common and are No. 3 vector registers. The fourth and the eighth vector registers 24 and 28 have a fourth register number in common and are No. 4 vector registers.

The first vector data processor 16 further comprises a first distributor unit 31 connected to the vector registers 21 through 24 of the first vector data processor 16. Likewise, the second vector data processor 17 comprises a second distributor unit 32 connected to the vector registers 24 through 28 of that vector data processor 17. The first vector data processor 16 still further comprises a first selector unit 36 connected to the vector registers 21 to 24 of the vector data processor 16 in question. The second vector data processor 17 comprises a second selector unit 37 connected to the vector registers 24 to 28 of the vector data processor 17 under consideration.

The vector data processing system further comprises a common distributor 39 between the first and the second distributors units 31 and 32 and the first and the second selector units 36 and 37. The functional unit may be included in each of the vector data processors 16 and 17. In the manner described in the patent applications referenced heretobefore for the Hayashi invention, such a functional unit may have input ports selectively connected to the vector registers of the vector data processor under consideration and output ports connected to the distributor unit of the vector data processor in question. The controller may be common to the vector data processors 16 and 17.

Each vector register of the first and the second vector data processors 16 and 17 is for holding a prescribed number n of vector elements and consequently comprises n memory cells for the respective vector elements. For convenience of reference, the memory cells of each of the vector registers 21 through 28 are given memory cell numbers and will be called zeroth through $(n-1)$-st memory cells from the top of each vector register successively to the bottom thereof.

The vector data processing system is capable of dealing with a vector datum consisting of more than n vector elements. When the vector data processors are two in number in the manner presumed above, the vector datum may consist of up to 2n vector elements which may be given vector element numbers of zeroth through $(2n-1)$-st element numbers. Each vector datum can therefore consist of zeroth through $(2n-)$-st vector elements 0, 1, 2, 3, 4, 5, ..., $(2n-2)$, and $(2n-1)$. In the illustrated example, the zeroth, the second, the fourth, ..., and the $(2n-2)$-nd vector elements 0, 2, 4, ..., and $(2n-2)$ of a vector datum are memorized in the zeroth through the $(n-1)$-st memory cells of the second vector register 22 in the first vector data processor 16. The first, the third, the fifth, ..., and the $(2n-1)$-st vector elements 1, 3, 5, ..., and $(2n-1)$ of the vector datum are memorized in the zeroth through the $(n-1)$-st memory cells of the sixth vector register 26 in the second vector data processor 17.

In the manner thus far described, the vector registers, such as 21 through 28, of a vector data processing system are divided into a predetermined number m of groups as circuit components of m vector data processors. In other words, the vector registers of the vector data processing system are classified or divided into a plurality of vector register sets with the vector registers, such as 21 and 25, 22 and 26, 23 and 27, or 24 and 28, of each set included in the respective vector data processors as, for example, 16 and 17. The vector registers of each set, namely, of a common register number, are for memorizing a vector datum in cooperation with one another.

The fact will now be readily appreciated by one skilled in the art once division of the vector registers into such groups is taught that the vector data processing system is operable at a high speed for a vector processing operation which should be carried out on one or more vector data, each vector datum memorized in such a vector register set. Incidentally, it may be noted here as will shortly become clear that a first memory cell number of the memory cell numbers, such as 0 through (n−1), may correspond to a second of the memory cell numbers that is equal to one plus the first memory cell number.

Figure 2:
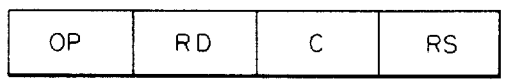
FIG. 2 shows a format of a vector move instruction.

Turning to FIG. 2 for a short while, a vector move or transfer instruction has an operation code field OP, a destination register field RD, a start element field C, and a source register field RS. The operation code field OP indicates vector data transfer, that is, vector move or transfer. The destination register field RD specifies one of the vector register numbers as a destination register number thereby to specify those of the vector registers 21 through 28 (FIG. 1) as destination registers which have the destination register number in common in the respective vector data processors 16 and 17 (FIG. 1). The source register field RS specifies another of the vector register numbers as a source register number to specify those of the vector registers 21 to 28 as source registers which have the source register number in common in the respective vector data processors 16 and 17.

It will again be presumed that the predetermined number m is equal to two. The start element field C specifies one of the vector element numbers as a start element number to specify one of the vector elements of a vector datum as a start element that is memorized in one of the memory cells of the source registers. If the start element field C specifies an even number, those of the vector elements of the vector datum are moved from one of the vector registers 21 through 28 of one of the vector data processors 16 and 17 to another of the vector registers 21 to 28 in one of the vector data processors 16 and 17 that is under consideration. If the start element field C specifies an odd number, those of the vector elements of the vector datum are moved from one of the vector registers 21 to 28 of one of the vector processors 16 and 17 to another of the vector registers 21 to 28 in the other of the vector data processors 16 and 17.

A different one of the program instructions is used in preliminarily specifying a vector data or word length, that is, a total number of vector elements which should be moved, namely, subjected to vector data transfer, from the source registers of a source register number to the destination registers of a destination register number.

Figure 3:
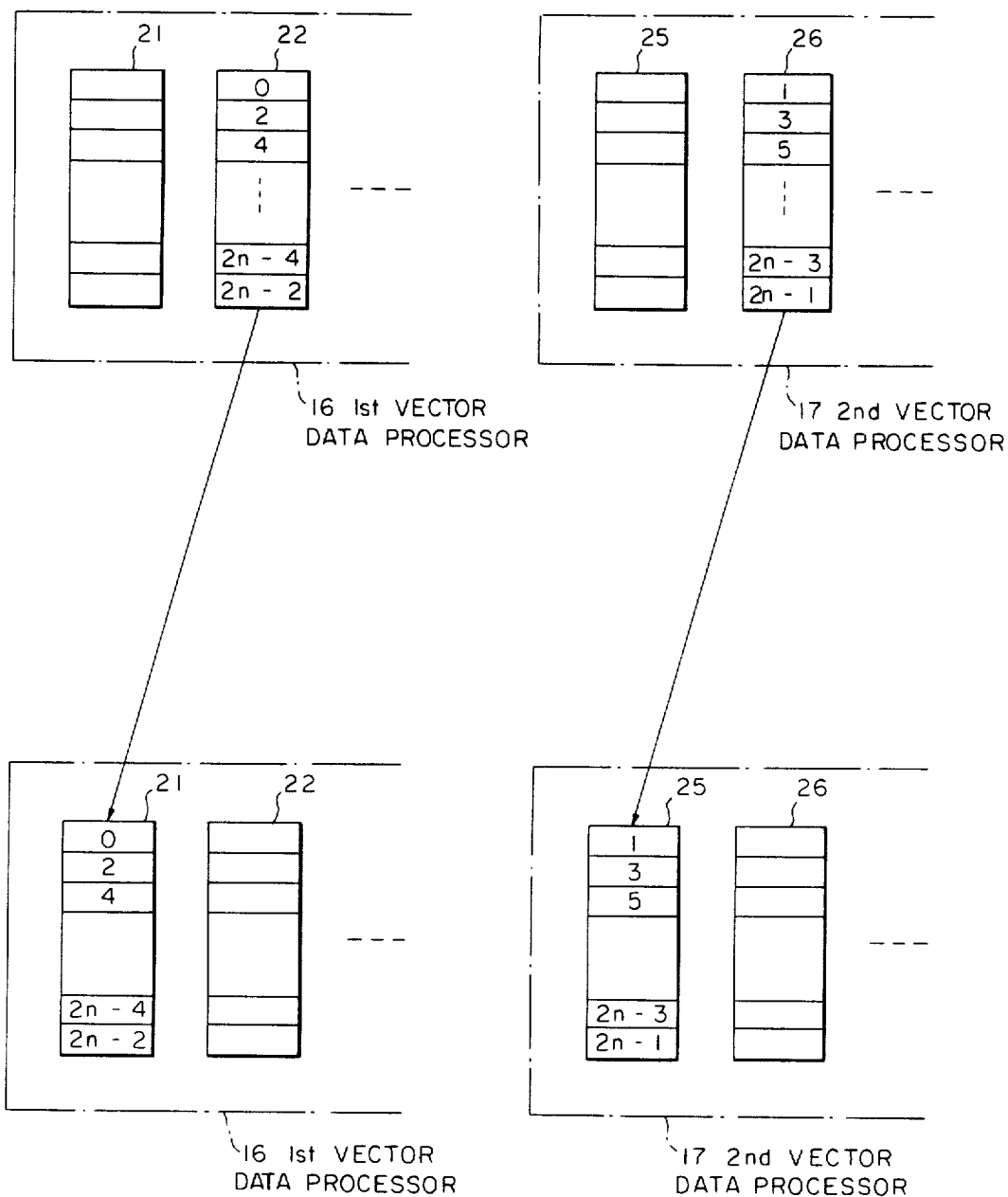
FIG. 3 is a diagram which is for use in describing vector data transfer in the vector data processing system depicted in FIG. 1.

Reverting to FIG. 1 and referring to FIG. 3 anew, it will be assumed that the destination register field RD of a vector move instruction specifies the first register number and the source register field RS, the second register number. Under the circumstances, the No. 2 or the second and the sixth vector registers 22 and 26 are source registers in the first and the second vector data processors 16 and 17. The No. 1 or the first and the fifth vector registers 21 and 25 are destination registers. It will furthermore be assumed that the start element field C specifies zero as the start element number. A different one of the program instructions preliminarily specifies 2n as the number of vector elements which should be subjected to vector data transfer. Incidentally, only a few of the vector registers 21 through 28 are depicted in FIG. 3 in the first and the second vector data processors 16 and 17. An upper half illustrates the vector elements before the vector data transfer. A lower half shows the vector elements immediately after the vector data transfer.

When the vector move instruction is supplied to the vector data processing system, the source register field RD makes the source registers 22 and 26 supply the first and the second selector units 36 and 37 simultaneously with the vector elements from each set of equally numbered memory cells of the source registers 22 and 26. For instance, the zeroth vector element 0 is read out of the zeroth memory cell of the second vector register 22. Concurrently, the first vector element 1 is read out of the zeroth memory cell of the sixth vector register 26. The selector units 36 and 37 deliver such vector elements to the common distributor 39. Inasmuch as the start element number is an even number, the common distributor 39 supplies the first and the second distributor units 31 and 32 with the vector elements delivered from the first and the second selector units 36 and 37, respectively, carrying out alignment of the vector elements. Responsive to the destination register field RD, the distributor units 31 and 32 deliver the vector elements to the destination registers 21 and 25.

More particularly, the first distributor unit 31 stores the zeroth vector element 0 in the zeroth memory cell of the first vector register 21 which is in the same vector data processor 16 as the source register 22. The second vector element 2 is stored in the first memory cell of the first vector register 21. In this manner, the (2n−2)-nd vector element (2n−2) is stored in the (n−1)-st memory cell of the first vector register 21. The second distributor unit 32 stores the first vector element 1 in the zeroth memory cell of the fifth vector register 25 of the second vector data processor 17 which includes the source register 26. The third vector element 3 is stored in the first memory cell of the fifth vector register 25. In a like manner, the (2n−1)-st vector element is stored in the (n−1)-st memory cell of the fifth vector register 25.

Figure 4:
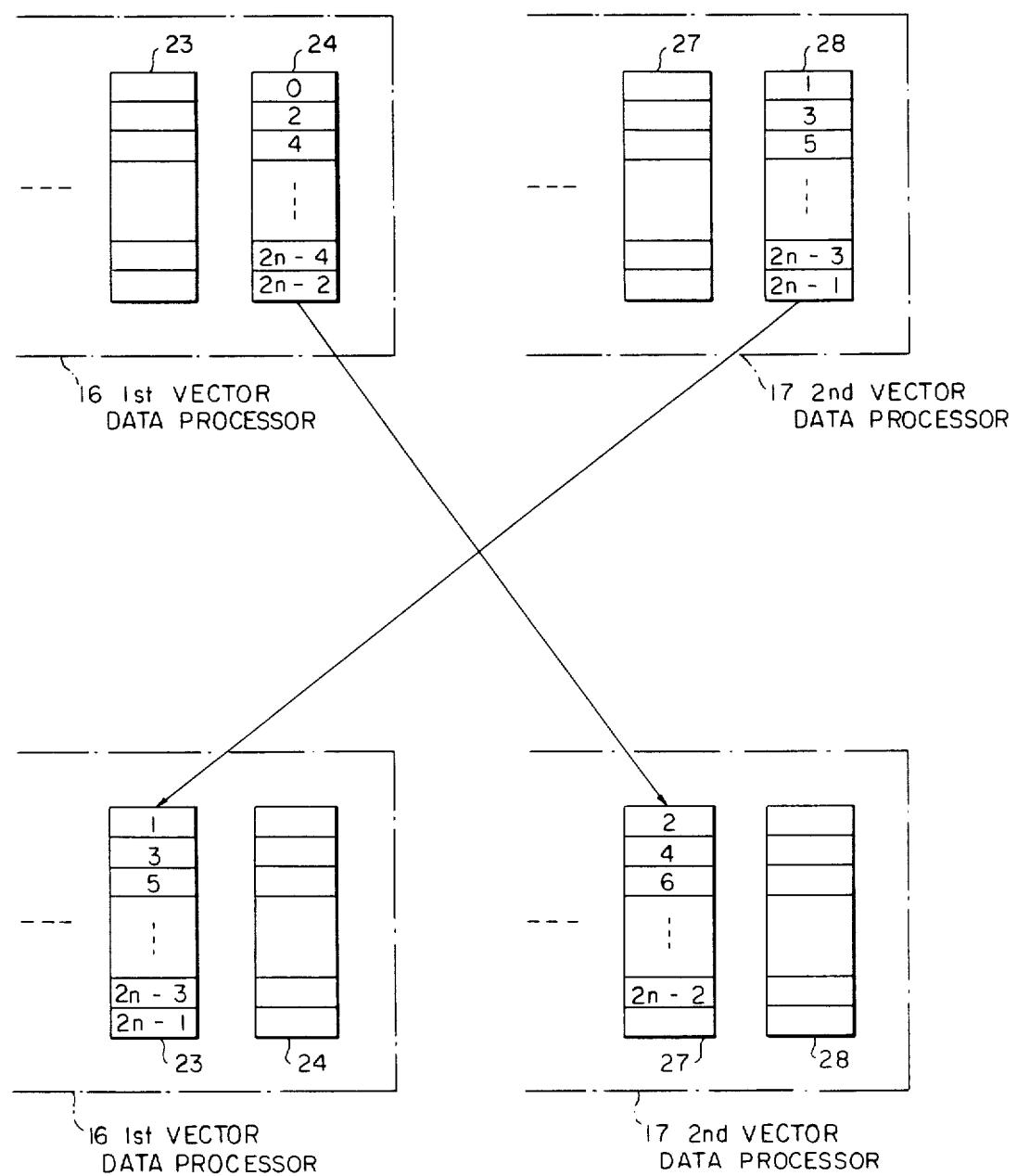
FIG. 4 is another diagram for use in describing vector data transfer in the vector data processing system illustrated in FIG. 1.

Referring to FIG. 1 again and to FIG. 4 afresh, it will now be assumed that the destination register field RD of a vector move instruction specifies the third register number and the source register field RS, the fourth register number. The No. 4 or the fourth and the eighth vector registers 24 and 28 are source registers in the first and the second vector data processors 16 and 17. The No. 3 or the third and the seventh vector registers 23 and 27 are destination registers. It will moreover be assumed that the start element field C specifies unity as the start element number.

When the vector move instruction is supplied to the vector data processing system, the source register field RS and the start element field C make the source registers 24 and 28 supply the first and the second selector units 36 and 37 simultaneously with the vector elements from each set of correspondingly numbered memory cells. More specifically, the first vector element 1 is delivered at first from the zeroth memory cell of the eighth vector register 28 of the second vector data processor 17. The second vector element 2 is simultaneously delivered from the first memory cell of the corresponding memory cell number in the fourth vector register 24 of the first vector data processor 16. Inasmuch as the start element number is an odd number, the common distributor 39 supplies the first and the second distributor units 31 and 32 with the vector elements delivered from the second and the first selector units 37 and 36, respectively, carrying out alignment of the vector elements. The destination register field RD makes the first and the second distributor units 31 and 32 store the vector elements in the destination registers 23 and 27 connected thereto.

More in detail, the first distributor unit 31 stores the first vector element 1 in the zeroth memory cell of the third vector register 23 of the first vector data processor 16. The third vector element 3 is stored in the first memory cell of the third vector register 23. Similarly, the (2n−1)-st vector element (2n−1) is stored in the (n−1)-st memory cell of the third vector register 23. The second distributor unit 32 stores the second vector element 2 in the zeroth memory cell of the seventh vector register 27 of the second vector data processor 17. The fourth vector element 4 is stored in the first memory cell of the seventh vector register 27. Likewise, the (2n−2)-nd vector element (2n−2) is stored in the (n−2)-nd memory cell of the seventh vector register 27. When the different one of the program instructions preliminary specifies (2n−1) as the number of vector elements which should be moved, the zeroth vector element 0 is discarded.

When the different program instruction preliminarily indicates 2n as the number of vector elements which should be moved, the zeroth vector element 0 is stored in the (n−1)-st memory cell of the seventh vector register 27. At any rate, the vector data transfer results in storage of the vector elements of a vector datum in the destination registers 23 and 27 in the manner exemplified in the foregoing. On subsequently using the third and the seventh vector registers 23 and 27 as, for example, new source registers, the vector elements are renumbered in the manner exemplified with reference to FIG. 1 in conjunction with the second and the sixth vector registers 22 and 26.

In FIG. 1, conflict takes place in the common distributor 39 when the vector data transfer should concurrently be carried out between the source registers and the destination registers in response to at least two vector move instructions of types exemplified in connection with FIGS. 3 and 4. A vector move instruction of one of the types of FIGS. 3 and 4 must be executed after completion of execution of another vector move instruction of the other type. As a consequence, the fundamental vector data processing system has a slow speed insofar as the vector move instructions are concerned.

Referring now to FIG. 5, the description will proceed to a vector data processing system according to a preferred embodiment of this invention. In FIG. 5, the vector data processing system comprises similar parts which are designated by like reference numerals and are operable with likely named signals. It will once more be presumed that the predetermined number m is equal to two.

The first distributor unit 31 (FIG. 1) of the first vector data processor 16 is divided into first and second distributors 41 and 42. Similarly, the second distributor unit 32 of the second vector data processor 17 is divided into third and fourth distributors 43 and 44. The first selector unit 36 (FIG. 1) is divided into first and second selectors 46 and 47. Likewise, the second selector units 37 is divided into third and fourth selectors 48 and 49. The common distributor 39 is used between the first and the third distributors 41 and 43 and the first and the third selectors 46 and 48. A first data transfer bus 51 is used between the second distributor 42 and the second selector 47 in the first vector data processor 16. A second data transfer bus 52 is used between the fourth distributor 44 and the fourth selector 49 in the second vector data processor 17.

Referring to FIG. 3 once again and additionally to FIG. 5, vector data transfer will be described in connection with the vector data processing system being illustrated. In the manner described before, the start element field C of a vector move or transfer instruction specifies zero as the start element number. The destination register field RD and the source register field RS are indicative of the first and the second register numbers. The different one of the program instructions preliminarily specifies 2n as the number of vector elements which should be subjected to the vector data transfer.

In the first vector data processor 16, the second vector register 22 successively delivers the vector elements 0, 2, 4, . . . , and (2n−2) to the second selector 47. In the second vector data processor 17, the sixth vector register 26 delivers the vector elements 1, 3, 5, . . . , and (2n−1) to the fourth selector 49 simultaneously with delivery of the respective vector elements 0, 2, 4, . . . , and (2n−2) in the first vector data processor 16. Use of the second and the fourth selectors 47 and 49 is indicated in FIG. 3 by arrows labelled cE, where E represents an even number which is used as the start element number.

In the first vector data processor 16, the second selector 47 delivers the vector elements to the second distributor 42 through the first bus 51. In the second vector data processor 17, the fourth selector 49 delivers the vector elements to the fourth distributor 44 through the second bus 52. Like the first distributor unit 31 described in conjunction with FIGS. 1 and 3, the second distributor 42 distributes the vector elements to the first vector register 21 for storage therein. Similarly, the fourth distributor 44 stores the vector elements in the fifth vector register 25.

It is now understood that use of the second and the fourth distributors 42 and 44, the second and the fourth selectors 47 and 49, and the first and the second busses 51 and 52 makes it possible to move the vector elements without use of the common distributor 39 when the start element field C of a vector move instruction specifies an even number as the start element number.

Referring to FIG. 4 once more in addition to FIG. 5, vector data transfer will be described as regards the vector data processing system being illustrated. As before, the start element field C of a vector move instruction specifies unity as the start element number. The destination register field RD and the source register field RS are indicative of the third and the fourth register numbers. The different program instruction preliminarily indicates (2n−1) as the number of vector elements which should be subjected to the vector data transfer.

In the second vector data processor 17, the eighth vector register 28 successively delivers the first, the third, the fifth, . . . , and the (2n−1)-st vector elements 1, 3, 5, . . . , and (2n−1) to the third selector 48 from the zeroth, the first, the second, . . . , and the (n−1)-st memory cells. In the first vector data processor 16, the fourth vector register 24 successively delivers the second, the fourth, . . . , and the (2n−2)-nd vector elements 2, 4, . . . , and (2n−2) to the first selector 46 from the correspondingly numbered memory cells concurrently with delivery of the respective vector elements 1, 3, 5, . . . , and (2n−3) in the second vector data processor 17. Use of the first and the third selectors 46 and 48 in this case is indicated in FIG. 4 by arrows labelled c0, where 0 represents an odd number which is used as the start element number.

The first and the third selectors 46 and 48 deliver the vector elements to the common distributor 39. Controlled by the odd number which is indicated by the start element field C of the vector move instruction being executed and is represented in FIG. 4 by an arrow c0, the common distributor 39 supplies the first and the third distributors 41 and 43 with the vector elements delivered from the third and the first selectors 48 and 46, respectively. The first and the third distributors 41 and 43 store the vector elements in the third and the seventh vector registers 23 and 27 in the manner described before with reference to FIGS. 1 and 4.

Reviewing FIGS. 3 and 4, it will now clearly be understood that the common distributor 39 is operable, without regard to vector move instructions indicative of vector data transfer only within each of the vector data processors 16 and 17, in response to another vector move instruction which indicates vector data transfer among the vector data processors 16 and 17. Occurrence of the above-mentioned conflict is therefore avoided. As an eventual result, the vector data processing system is operable at a high speed even in response to vector move instructions. The destination registers may be two or more in each of the vector data processors 16 and 17.

While this invention has so far been described in specific conjunction with a single preferred embodiment thereof, it will now be readily possible for one skilled in the art to derive various other embodiments of this invention from the foregoing. In the manner described here and there before, the vector data processing system may comprise more than two vector data processors.

When the vector data processing system comprises a predetermined number m of vector data processors, each vector register set consists of m vector registers, one in each vector data processor. The vector registers of each set is of the type described above and may be identified afresh as first through m-th vector registers. The third and the fourth distributors 43 and 44 may afresh be called first and second distributors of the second vector data processor 17 (FIG. 5). This applies to the third and the fourth selectors 48 and 49 and to similar distributors and like selectors of each of the third and other vector data processors.

The vector data processing system is for a vector datum consisting of up to mn vector elements which may be named zeroth through (mn−1)-st vector elements 0, 1, 2, 3, 4, 5, ..., m, ..., 2m, ..., and (mn−1). When such a vector datum is memorized in one of the vector register sets, the first vector register of the set under consideration is for the vector elements 0, m, 2m, ..., and m(n − 1). When each of the numbers 0 through (m−1) is represented by i, the i-th vector register of the set in question is for the vector elements (i+jm−1), where j represents zero through (n−1).

The start elements should be classified into m classes which may be termed zeroth through (m−1)-st classes. For the start elements of the zeroth class, the start element number is congruent with zero modulo the predetermined number m. For the start elements of a k-th class where k represents a class number other than zero, namely, an integer between on and (m−1) as the class number, the start element number is congruent with the class number k modulo the predetermined number m.

When the start elements are of the zeroth class, the second selectors, such as 47 and 49 (FIG. 5), should be used in the respective vector data processors. In cooperation with the second selectors, the second distributors should be used together with the data transfer busses in the respective vector data processors.

When the start elements are of the k-th class, the common distributor 39 (FIG. 5) should be used in supplying the first distributors, such as 41 and 43 (FIG. 5), of the respective vector data processors with the vector elements delivered from the first selectors connected to the respective source registers in different ones of the vector data processors. It is possible by another of the program instructions to decide the manner in which the common distributor 39 should distribute output signals of the last-mentioned first selectors to the first distributors connected to the respective destination registers. Alternatively, the manner of distribution may readily be decided by one skilled in the art so as to be most suitable to operation of the vector data processing system.

Summarizing, a vector datum has a plurality of vector elements which may be given zeroth through (mn−1)-st element numbers. The second selectors of the respective vector data processors are put into operation when the start element number is congruent with zero modulo the predetermined number m. The first selectors of the respective vector data processors are put into operation together with the common distributor 39 (FIG. 5) when the start element number is not congruent with zero modulo the predetermined number m.

From the description thus far made, it is now appreciated that the data transfer busses, such as 51 and 52, serve collectively as a specific common distributor for use in moving the vector elements within each vector data processor in response to a vector move instruction indicative of a start element number which is congruent with zero modulo the predetermined number m. This clearly shows that the common distributor 39 (FIG. 5) can be divided into a plurality of partial common distributors. For instance, the partial common distributors are (m−1) in number and are put into operation when the start element numbers are congruent with the respective class numbers k modulo the predetermined number m. Each vector data processor may comprise other distributor and selector in addition to the first and the second distributor and selector for connection to such partial common distributors.

What is claimed is:

1. In a vector data processing system comprising a predetermined number of vector data processors, each of said vector data processors comprising a plurality of vector registers, a respective distributor unit, and a respective selector unit, each of said respective distributor units and said respective selector units being connected to said vector registers, wherein;

said respective distributor units comprise a first and a second distributor;

said respective selector units comprising a first and a second selector;

each of said first and the second distributors and said first and said second selectors being connected to said vector registers;

said vector data processing system further comprising a common distributor connected to the first distributors of respective vector data processors and to the first selectors of the respective vector data processors;

each of said vector data processors further comprising a bus between the second distributor and the second selector of each vector data processor; and wherein an internal data path is formed by the vector registers, said respective second selectors which select an output of said vector registers, and the respective second distributors which distribute said output to said plurality of vector registers, and an external data path is formed by said respective first selectors which select an output of said vector registers, said common distributor and said respective first distributors which distribute said latter output to said respective plurality of vector registers and wherein data transfer operations through said internal data path and said external data path are performed in parallel.

2. A vector data processing system as claimed in claim 1, wherein the vector registers of said vector data processors are part of a plurality of vector register sets, the vector registers of each vector register set being in the respective vector data processors and operative for holding a vector datum.

3. A vector data processing system as claimed in claim 2, the vector registers of each vector register set being identified as first through m-th vector registers, each of the vector registers of said vector data processors operative for holding a prescribed number n of vector elements, said vector datum consisting of a plurality of vector elements having zeroth through (mn−1)-st element numbers, the i-th vector register of the vector register set holding said vector datum operative for holding one of said plurality of vector elements that has the (i+jm−1)-st element number where i represents each of one through said predetermined number m and j represents zero through (n−1), said vector data processing system being operable in response to a vector move instruction indicative of one of the zeroth through the (mn−1)-st element numbers as a start element number, wherein:

the second selectors of the respective vector data processors are put into operation when said start element number is congruent with zero modulo said predetermined number m;

the first selectors of the respective vector data processors being put into operation when said start element number is not congruent with zero modulo said predetermined number m.

* * * * *